United States Patent
Heilig et al.

(10) Patent No.: US 7,383,109 B2
(45) Date of Patent: Jun. 3, 2008

(54) MOTOR CONTROL IN VEHICLE POWER STEERING SYSTEM

(75) Inventors: Arnulf Heilig, Schwaebisch Gmuend (DE); Stephan Hiegler, Schwaebisch Gmuend (DE); Michael Bischofberger, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 145 days.

(21) Appl. No.: 10/983,196

(22) Filed: Nov. 4, 2004

(65) Prior Publication Data
US 2005/0096813 A1 May 5, 2005

(30) Foreign Application Priority Data
Nov. 4, 2003  (DE)  ................ 103 51 485

(51) Int. Cl.
B62D 5/04  (2006.01)
(52) U.S. Cl. ........................... 701/41; 180/446
(58) Field of Classification Search ........ 180/443, 180/444, 446; 701/41–44
See application file for complete search history.

(56) References Cited

U.S. PATENT DOCUMENTS

| | | | | |
|---|---|---|---|---|
| 4,538,698 A | * | 9/1985 | Hashimoto et al. | 180/446 |
| 4,651,840 A | * | 3/1987 | Shimizu et al. | 180/446 |
| 4,735,271 A | * | 4/1988 | Shimizu | 180/446 |
| 5,457,632 A | * | 10/1995 | Tagawa et al. | 701/43 |
| 5,623,409 A | * | 4/1997 | Miller | 701/41 |
| 6,486,582 B1 | * | 11/2002 | Patarchi | 310/166 |
| 2001/0032046 A1 | * | 10/2001 | Nada | 701/82 |
| 2002/0007241 A1 | * | 1/2002 | Kupper et al. | 701/51 |

FOREIGN PATENT DOCUMENTS

| | | |
|---|---|---|
| DE | 69523406 | 6/2002 |
| JP | 62-184967 | 8/1987 |

\* cited by examiner

Primary Examiner—Khoi H. Tran
Assistant Examiner—Jonathan Goldfarb
(74) Attorney, Agent, or Firm—Jordan and Hamburg LLP (57) ABSTRACT

A vehicle power steering system suppresses chattering, i.e., unpleasant noises in the form of mechanical and generally higher frequency oscillations resulting from backlash in a gear connection transmitting the torque from the motor to the steering wheel mechanics, produced under certain driving conditions. A control system is provided which evaluates the rotor rpm of the electric motor, and increases the dynamic response time of the rotor in the event that the evaluation of the rotor rpm indicates an unstable state of the control system. As a result, chattering is suppressed only when a critical driving situation arises in which the control system becomes unstable, while, in the normal state, the steering system exhibits all properties thereof, and is neither delayed nor limited in a dynamic behavior thereof.

9 Claims, 8 Drawing Sheets

MOTOR CONTROL IN VEHICLE POWER STEERING SYSTEM

BACKGROUND OF THE INVENTION

The invention relates to a vehicle power steering system with an electric motor as well as to a method for controlling an electric motor of such a power steering system.

Power steering systems with an electric motor are frequently also referred to in brief as electric steering systems and are widespread, particularly in vehicles of the lower category (subcompact cars). Increasingly, however, they are also used in vehicles of the compact and full-sized categories. Usually, these power steering systems have an electronic control, which controls the electric motor dynamically, so that the latter, in addition to the steering-wheel torque applied by the driver of the vehicle, generates a motor torque supporting the steering-wheel effort. In comparison to hydraulically assisted power steering systems, which are also referred to in brief as hydraulic power steering systems or servo steering systems, electric steering systems have the advantage that the electric motor can be controlled very accurately by means of a control system. Generally, the known control systems are processor-controlled circuits, which can be programmed so that the control of the electric motor is adapted to the particular requirements and the behavior of the electric steering, can be adjusted very flexibly. The motor torque supporting the steering-wheel effort usually is transferred to the steering mechanics, comprising a gear rack or a recirculating ball nut, over a transmission connection, preferably over a worm gear. It has turned out that the steering mechanics, including the transmission connection, cannot be constructed completely without backlash or, at least, completely without elasticity, perhaps at the worm gear. Under certain driving conditions, this backlash or elasticity leads to chatter, so that a mechanical, generally high frequency vibration can arise and caused an unpleasant, disturbing noise. This state of the phase occurs, above all, when the adhesion of the vehicle to the roadway is only slight under conditions of low friction, as is the case especially when the roadway is wet or covered by ice (glazed frost).

The JP-A62184967 discloses a power steering system with an electric motor, for which the voltage, supplying the electric motor (voltage V4), is specified by the electronic control system. As long as the steering wheel is kept neutral by the driver, that is, as long as the steering-wheel torque is zero, the supply voltage is also set to zero, so that the motor does not produce a torque. As soon as the steering wheel is moved in the positive direction, that is, as soon as there is a positive steering-wheel torque, the supply voltage is generated and, to begin with, held by a delay circuit, at a low voltage (VO) for a particular period of time (TO) in order to suppress the chatter brought about by the transmission (reduction gear 9). This measure takes place always and independently of the driving situation, that is, also in the normal state, when the friction values are large enough and there is no chatter. However, the behavior of the steering system in the normal state is made worse unnecessarily by the delay, which is always provided.

SUMMARY OF THE INVENTION

It is an object of the invention to propose a power steering system with an electric motor and a method for controlling the electric motor, for which the disadvantages mentioned do not occur.

Accordingly, it is proposed that the control system evaluates the rpm of the rotor of the electric motor and increases the dynamic response time of the rotor in the event that the evaluation of the rpm of the rotor indicates an unstable state of the control system.

By means of these measures, it is achieved that chattering is suppressed only when a critical driving situation arises, in which the control system becomes unstable. The measures proposed intervene selectively and directly in the motor dynamics, so that the development of mechanical chattering is prevented effectively, immediately and quickly only in a case of need, when an unstable state arises. In the normal state, however, the inventive steering system exhibits all of its properties and is not delayed or limited in its dynamic behavior.

Accordingly, it is advantageous if the electric motor is an asynchronous motor and if, in the unstable state, the control system increases the dynamic response time of the rotor by means of a field-oriented control of the asynchronous motor. A very effective suppression of chattering is achieved with this development.

It is also advantageous if the control system monitors the speed of the vehicle and evaluates the rpm of the rotor, in order to recognize the unstable state, only when the speed of the vehicle does not exceed a first specified value. By these means, it is achieved that an identification of chattering is carried out only at very low driving speeds. These additional measures are based on the realization that chattering and the unstable state of the control system associated therewith can be recognized reliably only at very low speeds, such as 25 km/h or less.

A further advantage arises if the control system evaluates the rpm of the rotor in that it monitors the change in the rpm of the rotor as a function of time and, if the control system recognizes the unstable state, in the event that the rpm of the rotor fluctuates periodically at least over a specified period of time, especially with a frequency, which lies within a specifiable region. By these means, a rapid and reliable identification of chattering is realized with simple means.

It is also advantageous if the control system monitors the speed of the vehicle and, in the unstable state of the control system, increases the dynamic response time of the rotor only one if the speed of the vehicle does not exceed a second specifiable value. By these means, it is achieved that the dynamic behavior of the steering is limited somewhat only at low driving speeds and not at higher speeds. This additional measure is based on the realization that, at higher speeds of, for example, 40 km/h and more, the chattering and the mechanical reactive effects and noises produced in the vehicle are relatively low in relation to the total reactive effects of the steering and the total noise, and are tolerated by the driver.

It is furthermore of advantage if the control system, in the stable state of the latter, decreases the dynamic response time of the rotor in that it acts upon the dynamic control of the electric motor with a first factor, which has a positive algebraic sign, and that, in the unstable state of the control system, the latter increases the dynamic response time of the rotor in that it acts upon the dynamic control of the electric motor with a second factor, which is smaller than the first factor and/or which has a negative algebraic sign. Accordingly, it is achieved that, in the normal state, the motor dynamics are increased, so that the steering reacts very quickly and that, in the unstable state, however, the dynamics are taken back, so that the physical response time of the rotor is not affected by the control system or is even increased.

In this connection, it is particularly advantageous if the control system monitors the speed of the vehicle and determines the negative factor by means of a characteristic curve function, which depends at least on the speed of the vehicle, and especially on the speed of the vehicle, on the rotor rpm and on a change in the algebraic sign of the steering-wheel torque. Due to these additional measures, a flowing transition from the unstable state back into the stable state is achieved.

Advantageously, the control system is a PD controller, which has at least one proportional element and at least one differential element, the PD controller controlling the electric motor by means of a characteristic curve function specified by its proportional element and, in the unstable state, acting upon the characteristic curve function with a time-delaying filter function. With that, a construction is proposed which is realized quite easily.

In order to realize the invention, it is also advantageous if the motor is controlled by means of a state machine, which comprises three states, the first state being assumed in order to activate or deactivate the recognition of the unstable state of the control system and the second or third state being assumed in order to evaluate the rpm of the rotor for identifying the unstable state.

In this connection, it is particularly advantageous if the speed of the vehicle is monitored in the first state and if, for identifying the unstable state, there is a changeover into the second or third state in the event that the speed of the vehicle exceeds a specifiable first value, the positive or negative acceleration of the rotor being determined from the change in the rpm of the rotor as a function of time and compared with a limiting gradient value, a changeover into the second state being made in the event that the positive rotor acceleration exceeds the limiting gradient value and a changeover into the third state being made in the event that the negative rotor acceleration exceeds the limiting gradient value.

In this connection, it is also particularly advantageous if the speed of the vehicle is monitored and the identification of the unstable state is deactivated in the first state in the event that the speed of the vehicle exceeds a specifiable second value.

Likewise, it is of advantage for the realization if, in the second state, the negative acceleration of the rotor is compared with the limiting gradient value and if it is checked whether this limiting gradient value is exceeded less frequently than a specifiable number. In the event that this is the case, there is a change into the first state, in order to deactivate the identification of the unstable state. On the other hand, if this is not the case, there is a change into the third state.

In this connection, it is particularly advantageous if, in the third state, the positive rotor acceleration is compared with the limiting gradient value in the third state and if it is ascertained whether this limiting gradient value is exceeded less frequently than a specifiable number and, if this is the case, a changeover is made into the first state in order to deactivate the recognition of the unstable state, or, if this is not the case, a changeover is made into the second state.

The invention is now described in greater detail by means of an example and by means of the attached drawings in which the following diagrammatic representations are presented.

BRIEF DESCRIPTION OF THE DRAWINGS

FIG. 3 shows the construction of an input module for suppressing chatter.

DESCRIPTION OF THE PREFERRED EMBODIMENTS

Figure 1:
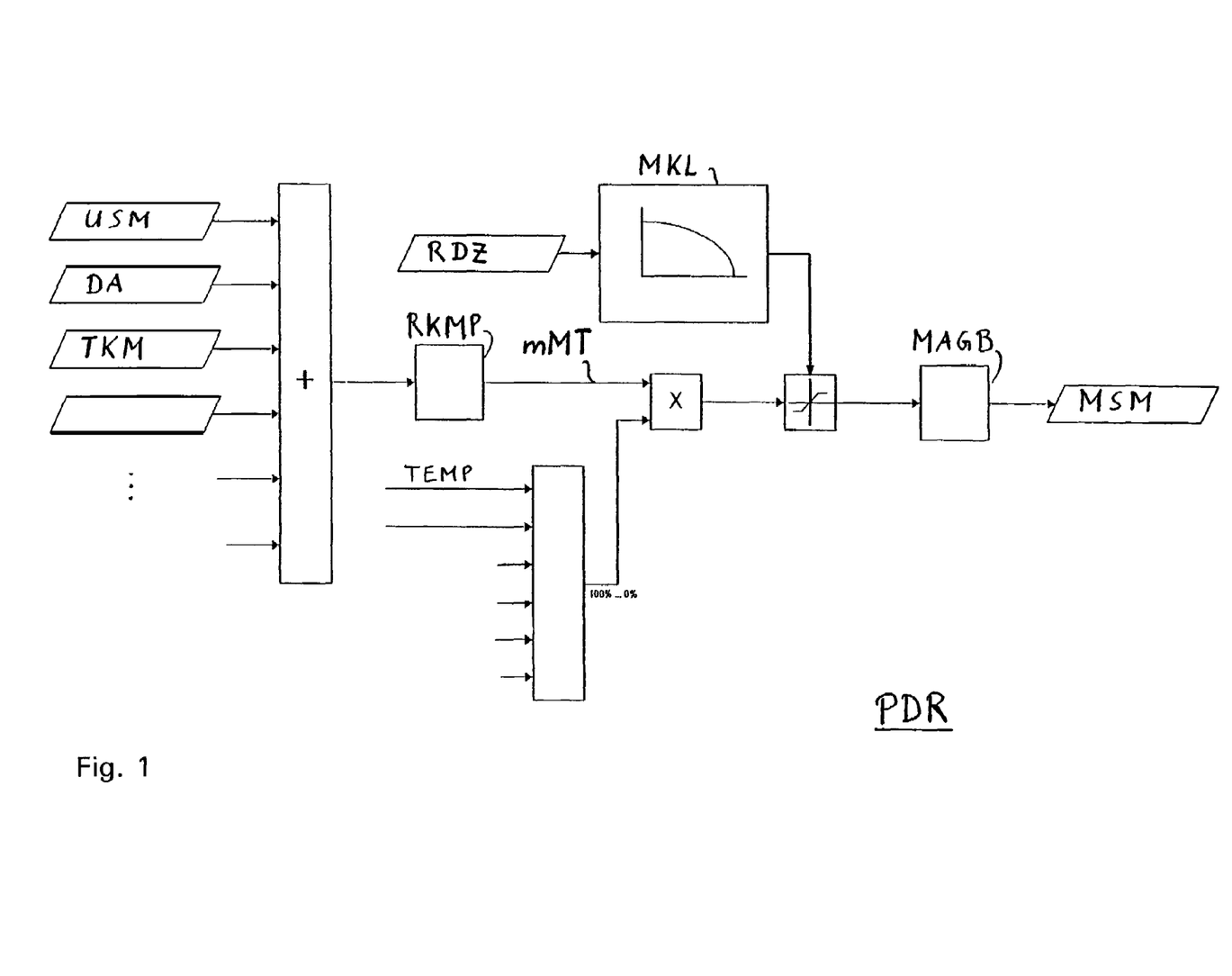
FIG. 1 shows the construction of a motor control system for a conventional power-steering system without suppression of chatter.

FIG. 1 shows a PDR control system of a conventional circuit design. The control system is constructed as a PD controller and triggers an electric motor in a power-steering system. A nominal motor torque MSM, which is to be generated by the electric motor in order to support the manual steering power, is calculated from the various input data or signals. The input quantities for the circuit shown include a supporting torque USM, which represents the proportional portion of the control system shown, as well as a signal DA, which corresponds to a first differential portion. In addition, a further differential portion TKM, which represents a response time compensation torque, is fed into the circuit as input quantity. Further input quantities are not given more detailed consideration here. The USM, DA and TKM signals are ascertained by input modules, which are described in greater detail below by means of FIG. 2.

All the input quantities named (USM, DA and TKM) are summed and subsequently supplied to a calculation step (RKMP) for calculating the friction compensation, from which this step calculates a motor torque mMT. The motor torque is multiplied by a weighting factor, which is between 0 and 100%. Different input quantities, such as the temperature TEMP, the voltage and other parameters, are used to calculate the weighting factor. The weighted torque of the motor subsequently is supplied to a differentiation step. The differentiation is carried out as a function of the actual rotor rpm RDZ, the rpm of the rotor being filtered by means of a characteristic motor curve. The torque of the motor mMT, differentiated in this way, corresponds to the actual rise gradient of the torque. The latter is subsequently limited in an MAGB step, so that the nominal value, namely the desired motor torque MSM, is obtained as starting point.

This nominal quantity MSM is supplied to an electric motor controller, which is not shown, and preferably is a field-oriented motor controller. Accordingly, the electric motor can be controlled optimally independently of the various operating quantities.

Figure 2A:
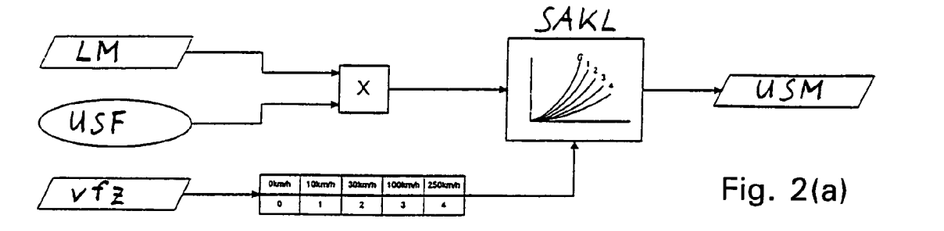
FIGS. 2a, 2b and 2c show input modules for this control system in three partial sections.
Figure 2B:
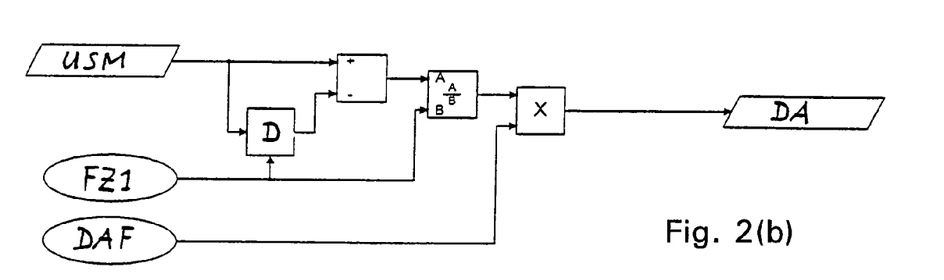
Figure 2C:
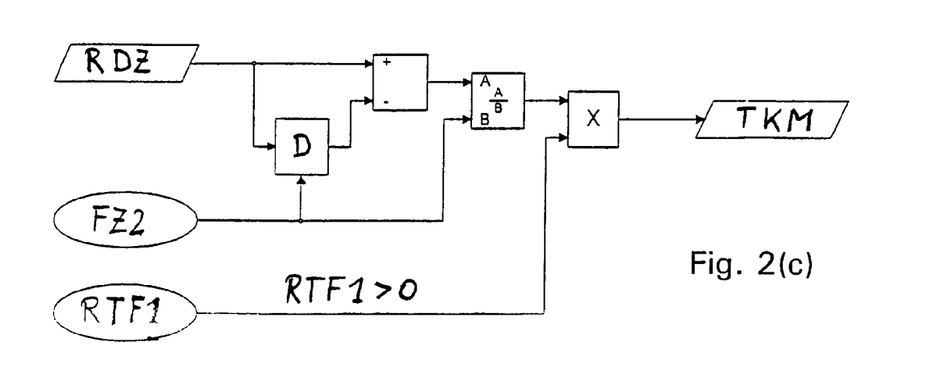

FIGS. 2a, 2b and 2c show the individual input modules which supply the input quantities for the previously described control system.

FIG. 2a shows an input module, which calculates the supporting torque USM by means the steering torque LM occurring, as well as the instantaneous vehicle speed vfz. To begin with, the steering torque LM, determined preferably with the aid of a torsion bar and a torque sensor, is multiplied by a so-called support factor USF, which may be between 0 and 150%. The steering torque, so weighted, is subsequently converted to the wanted support torque USM by means of a family of characteristic curves SAKL, which represents a group of functional courses, which reproduce the relationship between the supporting torque and the steering torque. One of these characteristic curves is now selected on the basis of the measured speed of the vehicle vfz. The characteristic curve is steeper at low speeds than at high speeds. Accordingly, a higher support torque is calculated at low speeds than at high speeds. This speed-dependent calculation facilitates, for example, the behavior of the steering system while the vehicle is being parked.

As second input module, FIG. 2b shows a circuit for calculating a first differential portion DA. This is calculated from the input quantities USM, that is, from the previously calculated supporting torque, as well as from two specifiable factors, namely a first factor FZ1, which indicates the filter time for a delay element D, and from a D proportional factor DAF, which can be determined and, for example, is between 0 and 20 milliseconds. To begin with, the support torque USM is supplied to a comparator and, parallel to this, to a delay element D, so that the actual signal USM is compared with the same signal that has been delayed. Accordingly, the support moment USM is differentiated. The delay depends on the previously selected filter time, which is given by the first factor FZ1 and may be between 1 and 8 milliseconds.

The starting signal of the comparator is set in proportion to the filter time FZ1. By forming this quotient, a signal is obtained, which is multiplied subsequently with the specified D proportional factor DAF. Finally, the desired D proportion DA is obtained from this.

As third input module, FIG. 2c shows a circuit for determining the response time compensation torque TKM. In principle, the circuit is constructed similarly to that previously described in FIG. 2b. However, the rotor rpm RDZ, as well as a second factor FZ2 and a rotor response time factor RTF1 are linked together here as input quantities. The rpm of the rotor is differentiated as a function of FZ2 and subsequently divided by this factor FZ2 and then multiplied by the factor RTF1. From this, the desired response time compensation torque is obtained.

All three of the quantities USM, DA and TKM, calculated by means of the circuit shown in FIG. 2, form the previously mentioned input quantities for the PDR control circuit shown in FIG. 1.

The circuit, shown here by means of FIGS. 1 and 2, is not yet in a position to compensate for or possibly prevent completely any chatter, that is, any irritating or annoying effects within an unstable state, which may occur. However, a circuit, constructed pursuant to the invention and shown, for example, in FIG. 3, is in a position to do so.

The inventive concept starts out from the realization that, in the case of an unstable state, the irritating or annoying chatter can be eliminated in that, in this case, the dynamic response time of the rotor is increased. Preferably, this is achieved owing to the fact that the response time compensation torque (see FIG. 2c), which usually is positive (RTF1 >0), is reduced clearly or even becomes a negative quantity.

In other words, in the past, as is customary in the normal state, a response time compensation torque TKM was calculated, which is clearly in the positive range. Instead, pursuant to the invention (see FIG. 3), a response time compensation torque TKM is now calculated, which is clearly smaller down to the value of zero or which may even be a negative quantity.

Figure 3:
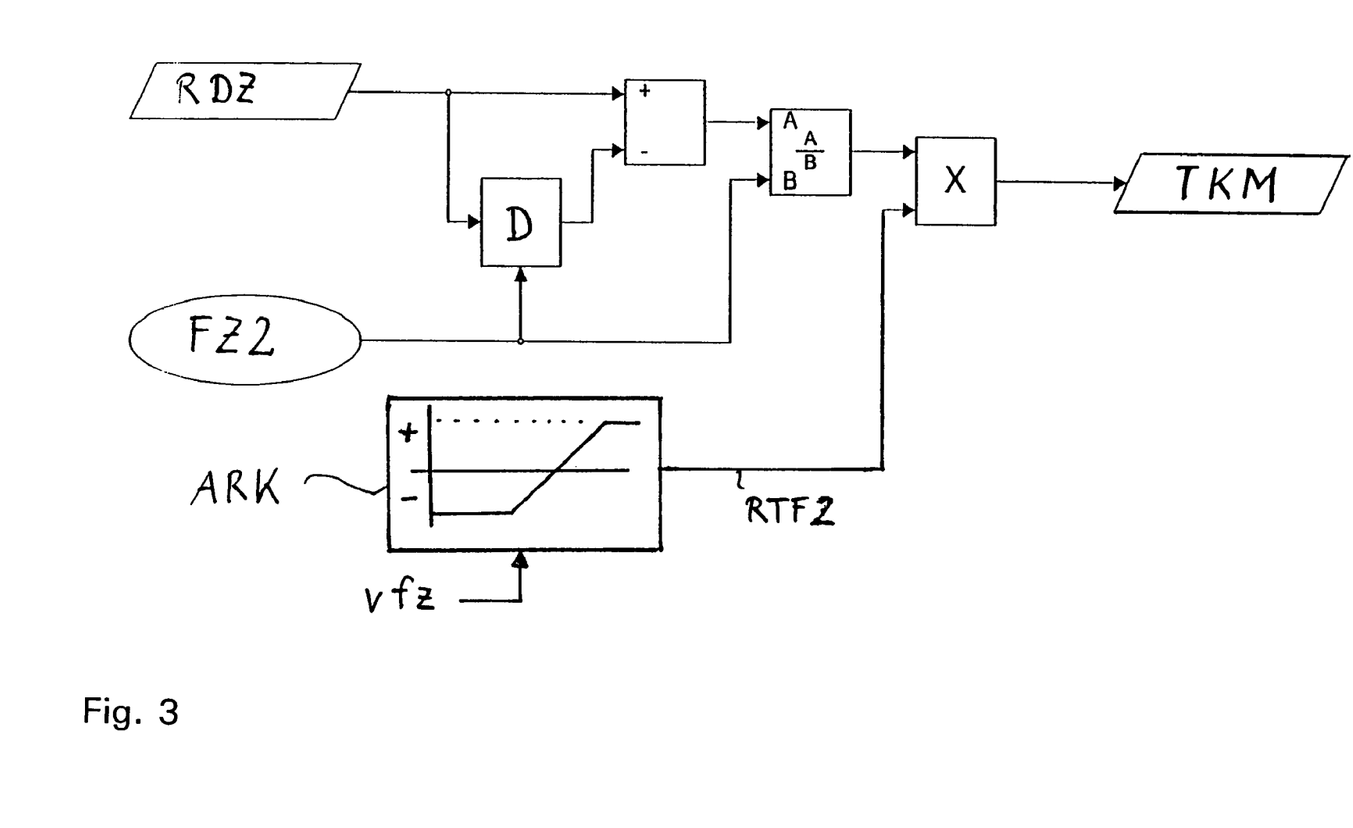
FIG. 3 shows the construction of an input module for a PD controller, equipped pursuant to the invention for suppressing chatter.

For this purpose and as is illustrated by FIG. 3, the input module of FIG. 2c, for example, is changed so that a rotor response time factor RTF2 with a negative algebraic sign or at least with a very low value is now calculated. This is done by means of a characteristic curve function ARK, which specifies a negative or an only slightly positive factor, depending on the speed of the vehicle. In the low range of speeds of, for example, 0 to 10 km/h, a negative factor is specified, which corresponds quantitatively to the usual RTF1 factor, but now has a negative algebraic sign. In the low range of speeds, a counter-compensation results from this with twice the weight, that is, the response time compensation torque has been compensated by the factor of two into the negative range.

As a result, the electric motor is made more sluggish than it normally is. If the speed of the vehicle increases, for example, from 10 km/h to 20 km/h, the compensation is increased linearly by means of the characteristic curve ARK. If the factor RTF2 reaches the value of zero, there is no compensation and the electric motor behaves according to its physical inertia. As the characteristic curve increases further, the factor RTF2 becomes positive. This means that the given response time of the electric motor is contained, that is, reduced. Finally, at speeds of, for example, 20 km/h and higher, the value of RTF2 becomes positive and corresponds to the usual factor RTF1 (see FIG. 2c). In this state, the response time compensation is adjusted once again to the normally customary value.

Pursuant to the invention, when instabilities and chattering occur, a counter-compensation is carried out, which increases the mass inertia of the rotor at least a low speeds. In the normal state, the response time of the rotor is lowered. In between, a gentle transition takes place, which is specified by a characteristic curve, which preferably is linear.

In addition to these measures, the steering torque, detected by the controller, can also be filtered, in order to dampen the calculation of the supporting torque USM. This is illustrated by means of FIG. 4, which shows a modification of the first input module (see FIG. 2a).

Figure 4:
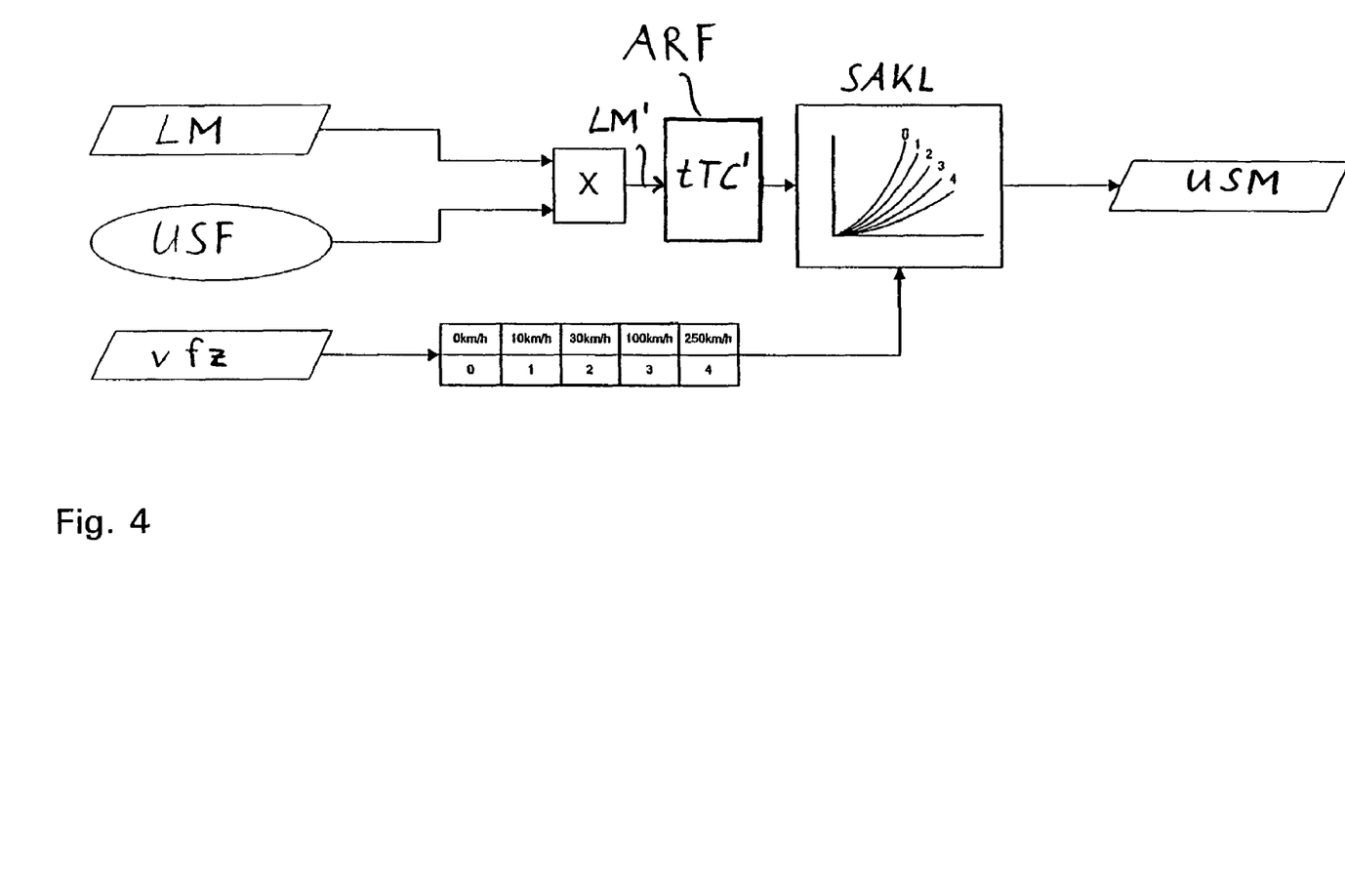
FIG. 4 shows the construction of an inventive input module, additionally equipped with a filter, for improving the suppression of chatter.

Pursuant to the invention, a time-delaying filter ARF was now inserted between the multiplication step and the characteristic curve function SAKL. This time-delaying filter ARF monitors the detected and weighted steering torque LM' as well as other quantities, in order to calculate from them a delay time tTC', with which the subsequent filter function SAKL, is acted upon.

Figure 5:
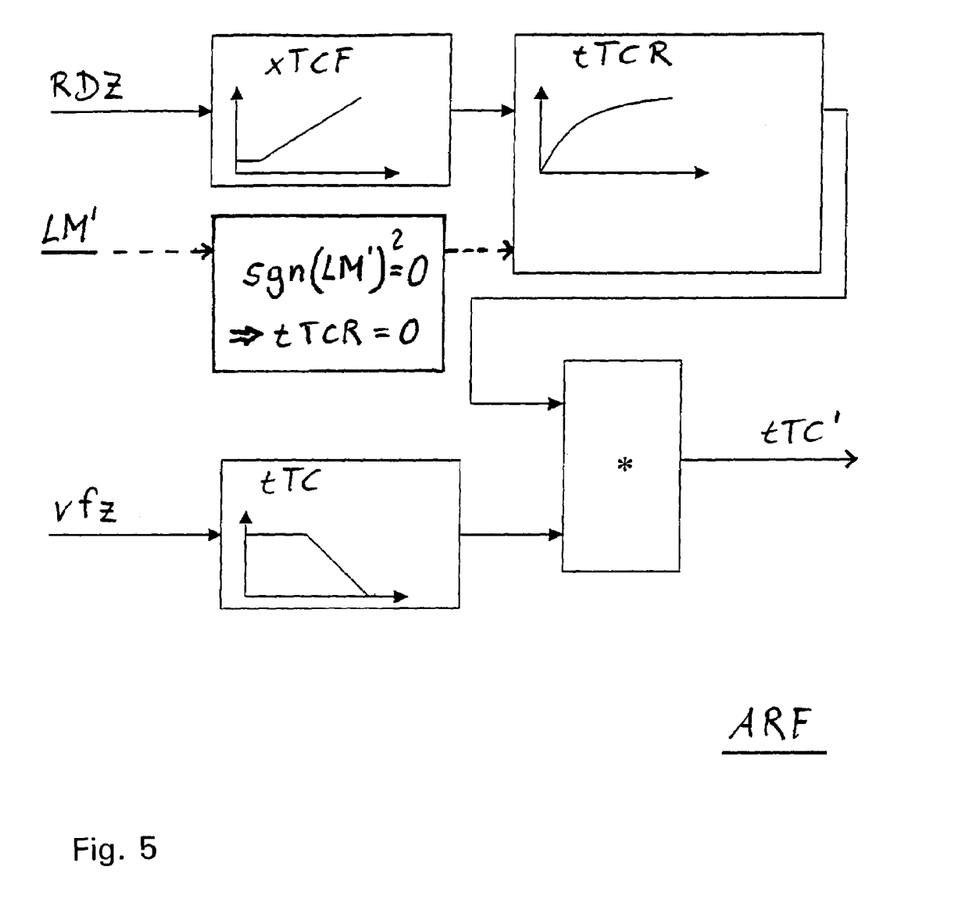
FIG. 5 shows the construction of this filter in greater detail.

The function of the time-delaying filter ARF is now described in greater detail by means of FIG. 5. The rotor rpm RDZ as well as the vehicle speed vfz and optionally the steering torque LM' detected are the input quantities. The rpm of the rotor is converted by means of a first characteristic curve rising essentially linearly and subsequently by means of a second characteristic curve rising positively against an asymptotic limiting value and supplied to a multiplier. The second input quantity is the vehicle speed vfz, which is supplied to the multiplier over a characteristic curve with essentially a degressive course. The product of the multiplication provides the wanted delay time tTC' and represents a time constant, with which the adjoining filter function SAKL (see FIG. 4) is acted upon in the event of an unstable state, in order to delay the calculation of the support torque USM somewhat timewise. Accordingly, the behavior of the control system as a whole is also slowed down by this measure and the dynamics are reduced further and this, in turn, acts counter to the chatter.

This measure can be improved even further in that the steering torque LM' determined (see FIG. 5) is also monitored and the result is set to zero in the event of a change in the algebraic sign. This takes place here, for example, owing to the fact that one of the characteristic curve functions (the tTCR function here) is set back to zero. This results in a time constant tTC' with the value of zero in the case of a change in the algebraic sign of the steering torque. Accordingly, any time-delaying control is excluded if a change in load occurs at the handwheel.

Figure 6:
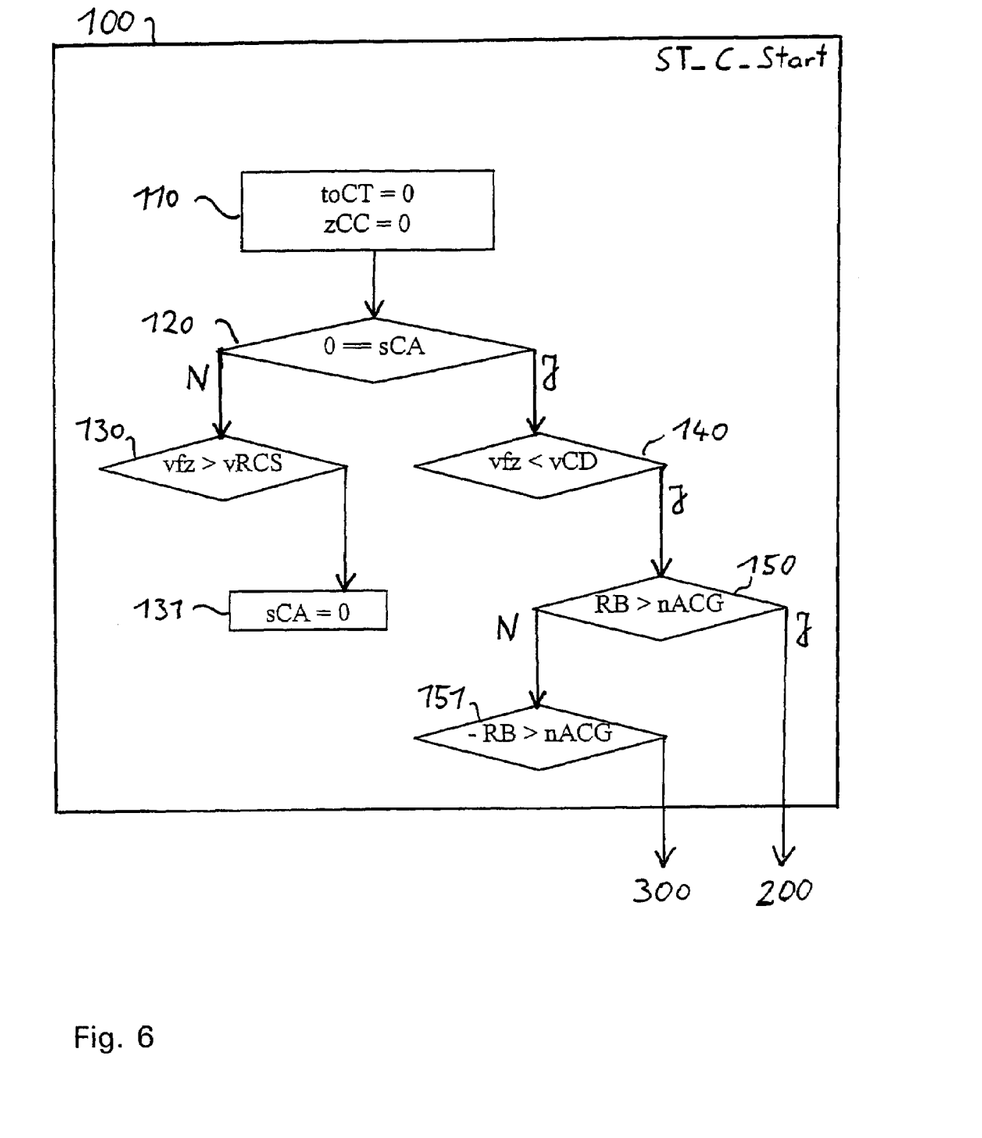
FIGS. 6-8 each show one of three states for a state machine, which is tied into the inventive control system.
Figure 7:
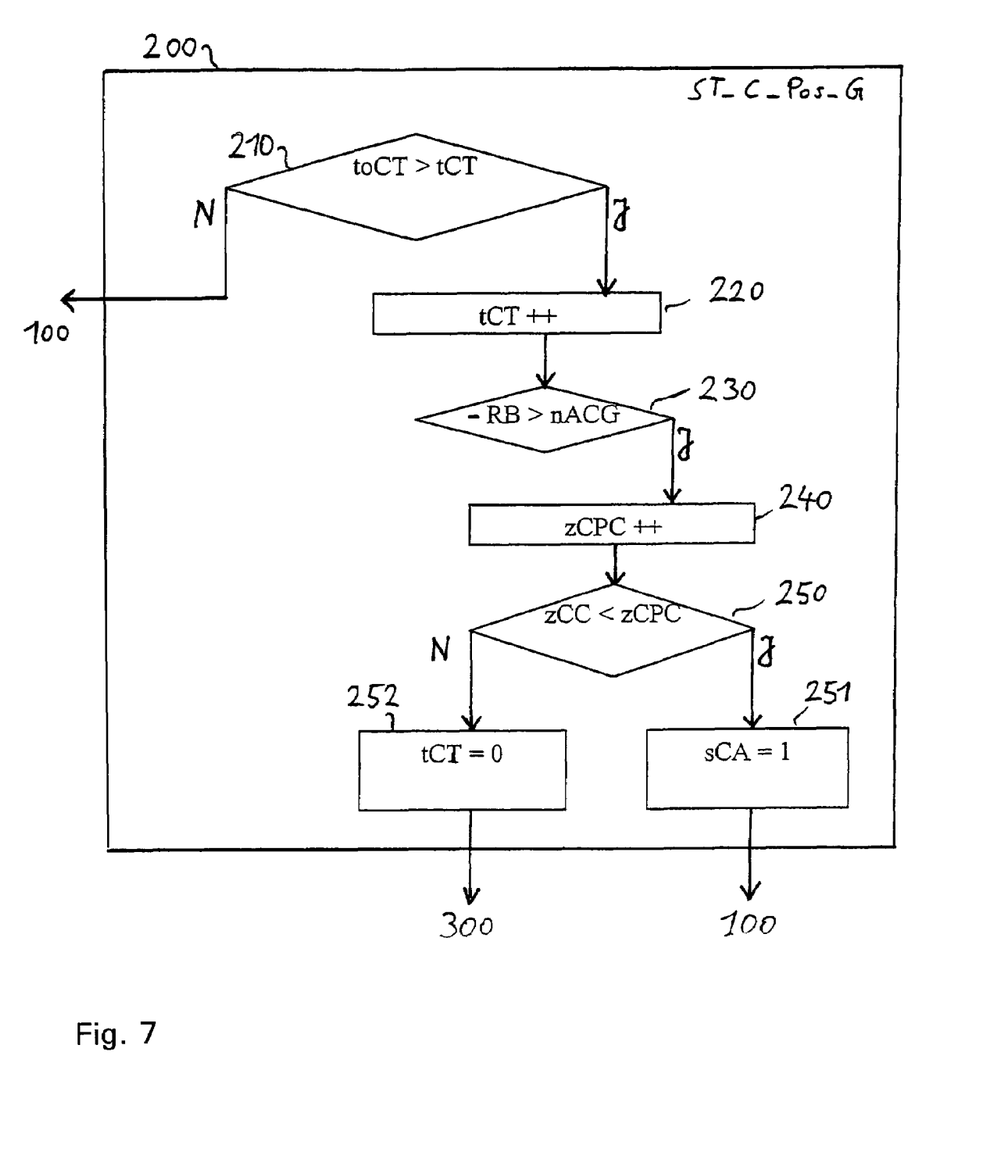
Figure 8:
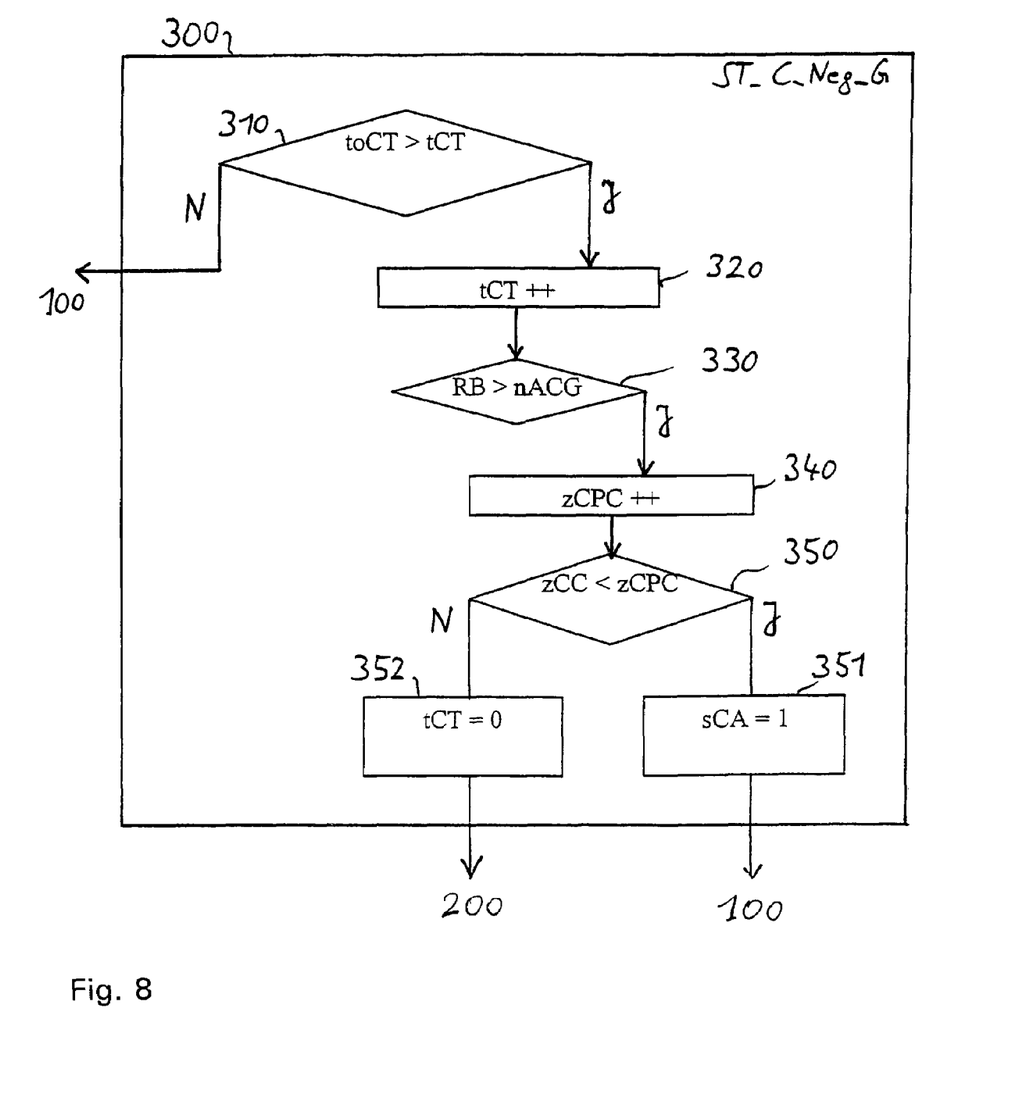

The control system described works according to an inventive method, which preferably includes a state machine. In FIGS. 6, 7 and 8, in each case one of three possible states is shown, which can be assumed by the state machine. FIG. 6 shows the first state 100, which at the same time reproduces the starting position of the controller behavior. In this state 100, essentially an activation or deactivation of measures to counter the shatter occurring is carried out. For this purpose, two parameters toCT and zCC are set to zero in a first block 110. Subsequently it is checked whether a parameter SCA, which may logically have the value of 0 or 1, has been set to 0. If this is not the case, chatter is noted and countermeasures are activated. For this purpose, the instantaneous vehicle speed vfz is compared with a comparison value vRCS in a block 130.

If the speed vfz is less than the comparison value, the countermeasures remain active, that is, sCA remains equal to 1. Otherwise, the parameter sCA is set to zero in a block 131, which then leads to a deactivation of the countermeasures.

However, if the examination in block 120 has revealed that the parameter sCA is equal to zero, the current speed vfz is compared with a different limiting value vCD in a block 140. If the speed is less than this value, the rotor acceleration, that is, the gradient of the rotor rpm monitored (see FIG. 3 RDZ), is determined in a block 150 and compared with a first limiting value nACG. If the positive rotor acceleration RB exceeds this limiting value, there is a change into the second state 200. Otherwise, a block 151 follows, in which the negative rotor acceleration -RB is compared with this limiting value. If the negative rotor acceleration -RB is larger than this limiting value, there is a change into the third state 300.

The second state is described in greater detail by means of FIG. 7. It describes chatter identification by means of the positive gradient of the rotor rpm, that is, of the positive rotor acceleration. Essentially, it is determined by means of a counting variable ZCPC whether the gradient occurs several times consecutively, so that it can be concluded that there is a periodic fluctuation of the rotor rpm, which is typical of an unstable state.

Optionally, starting out from state 200, there is also a change to the third state 300, which is shown by means of FIG. 8. A periodic fluctuation of the rotor rpm is detected there essentially by means of the negative gradient. As long as there is a periodic fluctuation of the rpm of the rotor, the method and the control circuit described assume that there is chatter and that, accordingly, countermeasures must be taken. As already described previously, the countermeasures taken depending on the speed of the vehicle.

Especially below a specifiable minimum speed vCD, which may, for example, be 25 km/h, chatter identification is not carried out (see FIG. 6, block 140). The countermeasures are also interrupted when a specifiable maximum speed vRCS, which may, for example, be 40 km/h, is exceeded (see block 130). Finally, the ascertained speed of the vehicle plays an important role while the countermeasures are being carried out (see FIG. 3, characteristic curve function ARK as a function of the speed vfZ).

As was described by means of the Figures, the invention includes very concrete measures, which have been coordinated precisely with one another. However, the basic principle of the invention can also be realized by various other embodiments. Essentially, the inventive measures aim to increase clearly the response time of the rotor in the event of an unstable state and, by so doing, eliminate the chatter and thus clearly improve the driving comfort.

The invention claimed is:

1. Vehicle power steering system, comprising:
an electric motor; and
an electronic control system configured to effect control of the electric motor dynamically, such that the electric motor generates a motor torque in addition to a steering torque exerted by the driver of the vehicle which supports the steering force, said control system being further configured to effect evaluation of the rotor rpm of the electric motor and, if a periodic fluctuation of the rotor rpm is detected by the evaluation, the control system being additionally configured to responsively effect an increase in the dynamic response time of the rotor.

2. The vehicle power steering system of claim 1, wherein:
the electric motor is an asynchronous motor; and
the control system, upon detection of the periodic fluctuation of the rotor rpm, is configured to increase the dynamic response time of the rotor by a field-oriented control of the asynchronous motor.

3. The vehicle power steering system of claim 1, wherein the control system is configured to effect monitoring of the speed of the vehicle and the rotor rpm in order to identify the periodic fluctuation of the rotor rpm only when the speed of the vehicle does not exceed a first value.

4. The vehicle power steering system of claim 1, wherein:
the control system evaluates the rotor rpm by monitoring a change in the rpm of the rotor as a function of time; and
the control system identifies that the rotor rpm fluctuates periodically by measurement over a prescribed period of time.

5. The vehicle power steering system of claim 1, wherein the control system monitors the speed of the vehicle and, when the periodic fluctuation of the rotor rpm is detected by the evaluation, the control system is configured to effect the increase in the dynamic response time of the rotor only if the speed of the vehicle does not exceed a second value.

6. The vehicle power steering system of claim 1, wherein the control system is configured such that, in the stable state of the control system, the control system decreases the dynamic response time of the rotor by acting upon the dynamic control of the electric motor with a first factor, which has a positive algebraic sign, and that the control system, when the periodic fluctuation of the rotor rpm is detected by the evaluation, increases the dynamic response time of the rotor, by acting upon the dynamic control of the electric motor with a second factor, which is smaller than the first factor and/or has a negative algebraic sign.

7. The vehicle power steering system of claim 6, wherein the control system is configured to effect a monitoring of the speed of the vehicle and a determination of the negative factor by means of a characteristic curve function, which depends at least on the speed of the vehicle, the rotor rpm and a change in the algebraic sign of the steering torque.

8. The vehicle power steering system of claim 1, wherein:
the control system includes a controller which has at least one proportional element and at least one differential element;
the controller controls the electric motor by means of a characteristic curve function which is specified by a proportional element thereof; and
the controller acts upon the characteristic curve function with a time-delaying filter function when the periodic fluctuation of the rotor rpm is detected by the evaluation.

9. The vehicle power steering system of claim 4, wherein the control system the control system is configured to responsively effect an increase in the dynamic response time of the rotor on condition that the rotor rpm fluctuates periodically over a specifiable period of time with a frequency which lies within a specifiable range.

* * * * *